A. A. GUEST & W. P. GIBBONS.
MACHINE FOR DISCHARGING AND CHARGING GAS RETORTS.
APPLICATION FILED DEC. 13, 1910.
1,009,739.
Patented Nov. 28, 1911.
2 SHEETS—SHEET 1.
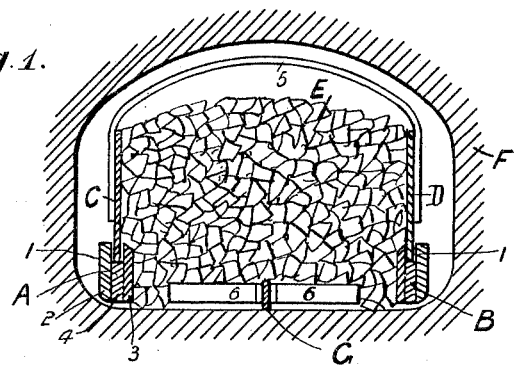
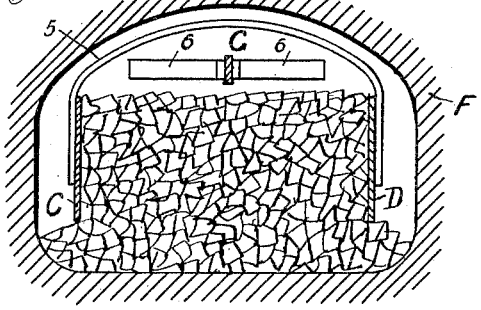
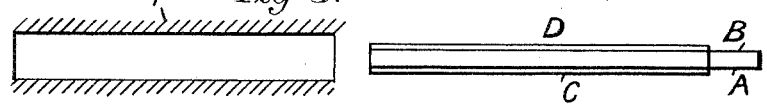
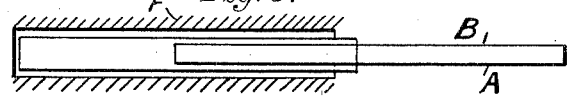
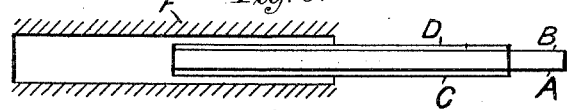
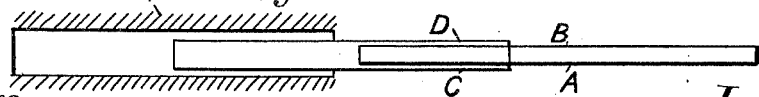

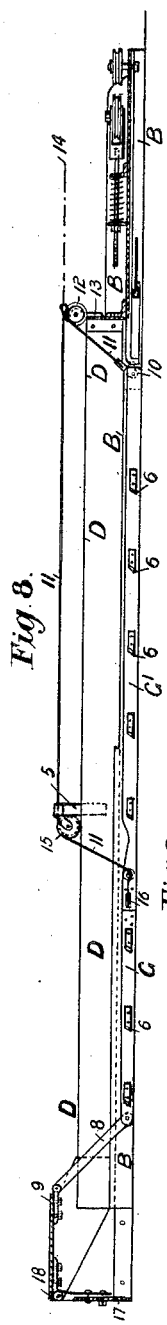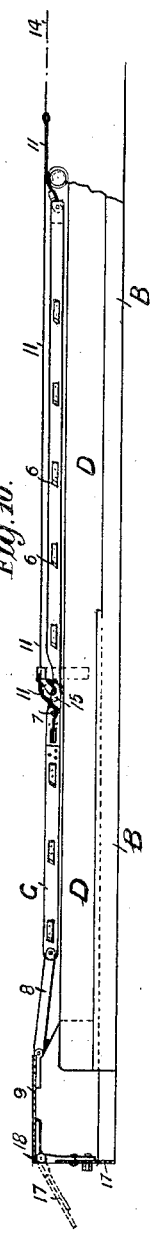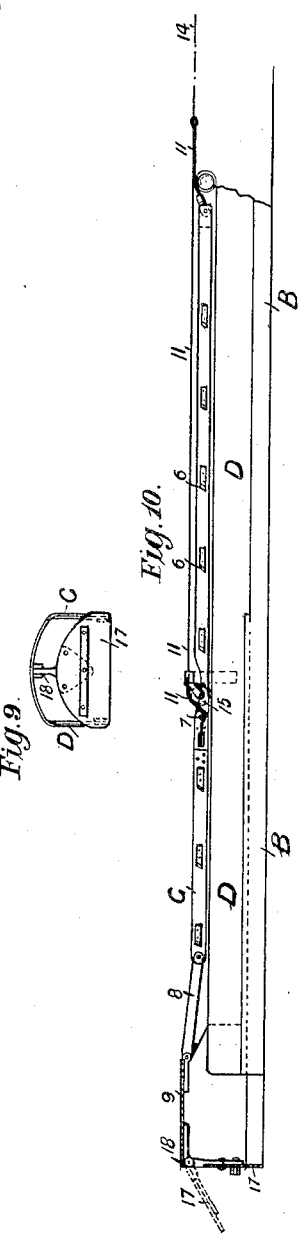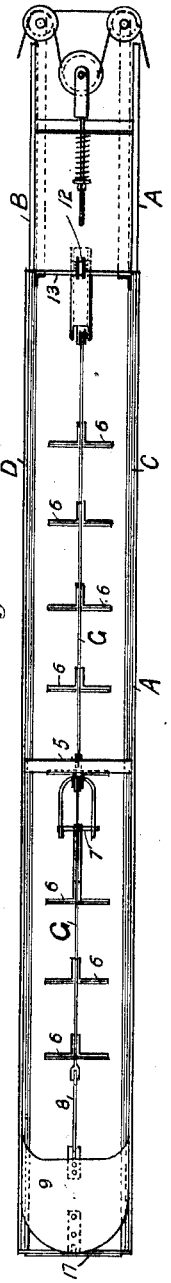

UNITED STATES PATENT OFFICE.

ALBERT ARTHUR GUEST AND WILLIAM PIKE GIBBONS, OF LOWER GORNAL, ENGLAND.

MACHINE FOR DISCHARGING AND CHARGING GAS-RETORTS.

1,009,739. Specification of Letters Patent. Patented Nov. 28, 1911.

Application filed December 13, 1910. Serial No. 597,167.

*To all whom it may concern:*

Be it known that we, ALBERT ARTHUR GUEST and WILLIAM PIKE GIBBONS, subjects of His Majesty the King of Great Britain and Ireland, residing at Dibdale Works, Lower Gornal, in the county of Stafford, England, foreman erector and managing director of a limited company, respectively, have invented new and useful Improvements in Machines for Discharging and Charging Gas-Retorts, of which the following is the specification.

This invention has reference to machines for discharging coke from one end of a double ended substantially horizontal gas retort simultaneously with the charging in of the coal at the other end of the retort.

Our improvements comprise the combination and employment with a discharging charger, of one or more longitudinal drag bars furnished at suitable intervals with cross bars fixed thereon forming scrapers, the drag bars being so mounted and arranged that as the charger makes its forward movement over the usual stationary plate at the front of the retort, the drag bars lie at the bottom of the charge and serve to keep the charge together and to deliver it into the retort, and when the whole of the charge has passed into the retort the drag bars are raised out of the charge and maintained in this position until the charger is withdrawn.

Our improvements also comprise the employment with the aforesaid drag bars of a charging trough which is or may be somewhat substantially longer than the retort and is open at the top and bottom and made with substantially vertical sides and suitably supported and adapted to enter the retort and to carry the coal therein and to push the coke therefrom. This charging trough has each of its sides formed of two or more lateral side bars capable of independent sliding movements, the lower bars being adapted to be withdrawn wholly or partially from the retort before the upper bars are wholly or partially removed therefrom or vice versa, and thus the friction of the stationary bars against the sides of the charge of coal in the retort will assist in maintaining the charge stationary while the other bars are being withdrawn; suitable mechanism being provided for imparting the necessary forward and backward movements to the trough and for removing the upper and lower sliding bars independently as aforesaid, and for raising and lowering the drag bar or drag bars.

On the accompanying drawings Figure 1 is a cross sectional elevation of a retort, and charging trough constructed in accordance with this invention in position therein, together with the charge of coal and the drag bar which serves to keep the charge together and deliver it into the retort; Fig. 2 is a similar view to Fig. 1 but showing the lower bars of the charging trough withdrawn and the drag bar which lies in the bottom of the trough during the forward movement of the latter raised to its highest position above the charge ready to be withdrawn with the upper portions of the charging trough. Figs. 3, 4, 5, 6 and 7 are diagrams to illustrate the operations of one form of our improved discharging charger; Fig. 8 is a sectional side elevation of one form of our improved discharging charger showing the drag bar in the position which it occupies as the charger is charging the coal into the retort; Fig. 9 is a front elevation of the same; Fig. 10 is a sectional side elevation of the main portions of the charger represented in Fig. 8 with the drag bar raised to the position which it occupies as the charger is being withdrawn; and Fig. 11 is a plan of the discharging charger shown in Fig. 8.

In carrying out this invention each side of the charging trough of the discharging charger is formed of two or more parallel side bars, preferably two bars on each side, arranged and fitted together one above the other so as to be capable of independent sliding movements. The lower bars shown in Fig. 1 are marked respectively A and B and the upper bars which are fitted and adapted to slide therein are marked respectively C, D. The bottom bars A, B are both thick bars each having in its top edge a longitudinal groove 1 in which the bottom edge of the corresponding upper bar C, D fits and slides. Each of the thick lower bars A, B can very readily be formed by riveting three thinner bars together side by side as shown in Fig. 1, the two outer bars 2, 3 being made wider than the central bar 4 so as to project up above the same and form the sides of the groove 1 of which the bottom will be formed by the top edge of the central bar 4. The upper vertical bars C, D are maintained at their proper distance apart by bridles 5 which are riveted thereto at suitable intervals apart along the trough and are made of such a size as to enter the retort F. Thus a bottomless open topped trough is formed, the width of which is somewhat less than the width of the retort F.

The longitudinal drag bar G (or there may be two or more of these longitudinal drag bars) which we use to keep the charge E together and deliver it into the retort F is furnished at suitable intervals with light cross bars 6 fixed thereto and forming scrapers and projecting from the central drag bar G. The longitudinal drag bar G is connected at suitable intervals to the bridles 5 fixed to the sides of the charging trough, which bridles as aforesaid, extend across the trough from side to side over the charge therein.

In the preferred form of construction of drag bar, the scrapers 6 are attached to the drag bar G so as to project outwardly therefrom at right angles as shown by Figs. 1, 2 and 11 although said scrapers may be so constructed as to incline toward the front of the charger. The mechanism for raising and lowering the drag bar G between the trough sides together with the scrapers which are fixed thereto can be arranged in various ways, but what we prefer is the arrangement illustrated by Figs. 8, 10, 11 of the drawings where it will be seen that the drag bar G is made in two lengths marked respectively G and $G^1$ which are connected together by a cross pin at 7. The whole lengths G and $G^1$ constitute the drag bar which it will be seen is somewhat shorter than the two upper side bars C, D. The front end of the drag bar G is connected by the inclined link 8 with an arched front plate 9 which is fixed to the side bars C, D, and extends as an arch from one bar to the other; the link 8 being at the center of the same. The other end 10 of the drag bar is connected to a wire rope 11 which passes over a guide pulley 12 carried by the back cross plate 13 which is fixed to the two side bars C, D and forms the back end of the trough. This wire rope 11 is connected to a wire rope 14 which is geared to a winding drum and the wire rope 11 also extends forward and passes over the guide pulley 15 and at its front end is connected to the drag bar G at the point 16 intermediate between the link 8 and the back end 10. It will be seen that by this arrangement if there is sufficient tension exerted on the wire rope 14 by its being wound on the winding drum the drag bar G, $G^1$ will be lifted at 16 and at 10 by the wire rope 11, and the link 8 will by the tension exerted upon the drag bar to which it is connected be caused to swing up and thus the drag bar will be raised as in Fig. 10 above the charge of coal as aforesaid, and by loosening the wire rope 14 the link 8 will owing to the weight of the drag bar G, and the scrapers 6 fixed to the latter lower the drag bar to the bottom of the charging trough as shown by Fig. 2. The hinged push plate 17 which is adapted to push the coke out of the retort F on the forward movement of the charger, is hinged at the front of the retort to the center 18 of the arch plate 9 as shown, so as to hang vertically when the charger is moving forward and to open upwardly in the usual way as indicated by dotted lines in Fig. 10 when the upper part of the charger is being withdrawn.

The discharging charger trough is preferably although not necessarily operated as follows:—When the empty charger is in position outside the retort F to be charged as in plan view Fig. 3 the upper bars C, D of the trough rest on the lower bars A, B and these rest on the platform of the usual carriage which carries the charger and also on the usual stationary plate at the front of the retort, the drag bar G being in the open bottom of the trough resting on the platform and stationary plate aforesaid. As the charging trough moves forward into the retort the coal falls down from an overhead bin or hopper into the trough at the proper speed through a chute near the front of the trough as is usual in other discharging chargers, and the coal is carried forward with the trough into the retort by the friction of the charge against the sides of the trough and by the drag bar G, which moves with the trough, and at the same time the push plate 17 at the front of the charging trough pushes the coke out at the other end of the retort. When the charging trough with the charge of coal has thus moved forward as far as required toward the other end of the retort as in Fig. 4 the two lower side bars A, B are now withdrawn for a certain distance say about half the length of the retort as in Fig. 5, the charge of coal remaining stationary in the retort, being there held by the drag bar G and by the friction of the charge on the bottom of the retort and against the side bars C, D which are by preference made of a greater depth than the lower bars A, B so as to expose a larger frictional surface to the coal than do the lower bars A, B. The drag bar is now raised out of the charge as in Fig. 2 and is now between the top of the charge and the underside of the top of the retort. The side bars C, D forming the upper part of the sides of the trough together with the drag bar G above the charge are now withdrawn as in Fig. 6, to the same distance as are the lower bars A, B on which the said upper bars slide, and while this operation is taking place the charge of coal E, in the retort F still remains stationary as aforesaid. Now the lower bars A, B are further withdrawn right out of the retort as in Fig. 7, the charge still being maintained stationary in the retort by the aforesaid friction on the bottom of the retort and against the stationary side bars C, D. Now the side bars C, D are wholly withdrawn out of the retort as in Fig. 3, leaving the charge of coal in the retort. As the side bars A, B are withdrawn the charge settles down to a certain extent and spreads out below the bottom edges of the side bars C, D as in Fig. 2, and thus leaves more room at the top of the charge for the removal of the drag bar G. Thus there is delivered an even and regular charge of coal throughout the length of the retort.

What we claim as our invention and desire to secure by Letters Patent is:—

1. A gas retort discharging charger having combined therewith one or more coal delivering drag bars with scrapers fixed thereto, and means for moving the drag bars with the charge into and along the bottom of the retort and out of the latter over the charge and means for raising said drag bars through the charge and for lowering said drag bars, substantially as and for the purpose herein set forth.

2. A gas retort discharging charger having one or more coal delivering drag bars with scrapers fixed thereto arranged within a charging trough, the drag bars being connected by links to an arch plate fixed to the front of a trough, and a wire rope or chain for raising the drag bars up through the charge in the retort or lowering them into the trough substantially as and for the purpose herein set forth.

3. A gas retort discharging charger having combined therewith one or more coal delivering drag bars with scrapers fixed thereto and means for moving the drag bars with the charge into and along the bottom of the retort and out of the latter over the charge and means for raising the drag bars through the charge and for lowering said drag bars, said charger also having a charging trough built up of parallel lower side bars, and parallel upper side bars carried by the lower side bars and adapted to slide thereon, and retained apart by bridles, substantially as and for the purpose herein set forth.

4. A gas retort discharging charger having combined therewith one or more coal delivering drag bars with scrapers fixed thereto and means for moving the drag bars with the charge into and along the bottom of the retort and out of the latter over the charge and means for raising the drag bars through the charge and for lowering said drag bars, said charger also having a charging trough built up of parallel lower side bars and parallel upper side bars carried by the lower side bars and adapted to slide thereon and retained apart by bridles said side bars being adapted to be operated and withdrawn from the retort independently of one another, substantially as and for the purpose herein set forth.

In testimony whereof we affix our signatures in presence of two witnesses.

ALBERT ARTHUR GUEST.
WILLIAM PIKE GIBBONS.

Witnesses:
GEORGE SWINFEN COTTRELL,
CHARLES BOSWORTH KETLEY.

---

Copies of this patent may be obtained for five cents each, by addressing the "Commissioner of Patents, Washington, D. C."